United States Patent
Asano

(10) Patent No.: US 9,457,444 B2
(45) Date of Patent: Oct. 4, 2016

(54) MACHINE TOOL HAVING MOVABLE COVERS

(71) Applicant: FANUC Corporation, Yamanashi (JP)

(72) Inventor: Keita Asano, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 264 days.

(21) Appl. No.: 14/221,680

(22) Filed: Mar. 21, 2014

(65) Prior Publication Data

US 2014/0286721 A1 Sep. 25, 2014

(30) Foreign Application Priority Data

Mar. 22, 2013 (JP) .................. 2013-059867

(51) Int. Cl.
*B23Q 11/08* (2006.01)
*B23Q 11/00* (2006.01)

(52) U.S. Cl.
CPC ....... *B23Q 11/0053* (2013.01); *B23Q 11/0825* (2013.01); *Y02P 70/171* (2015.11); *Y10T 409/30392* (2015.01)

(58) Field of Classification Search
CPC .............. B23Q 11/08; B23Q 11/0825; B23Q 11/0053; B23Q 11/0875; B23Q 11/0891; Y10T 409/30392; Y10T 409/304088
USPC .................................................. 409/134, 137
See application file for complete search history.

(56) References Cited

U.S. PATENT DOCUMENTS 5,113,558 A * 5/1992 Soroka ................ B23Q 11/128
184/6.14

FOREIGN PATENT DOCUMENTS

| DE | 3613520 A1 | 10/1987 |
|---|---|---|
| JP | 62168240 U | 10/1987 |
| JP | 6-91457 A | 4/1994 |
| JP | 11-70438 A | 3/1999 |
| JP | 2005224928 A | 8/2005 |
| JP | 2006123053 A | 5/2006 |

OTHER PUBLICATIONS

Office Action mailed Aug. 26, 2014, corresponding to Japanese patent application No. 2013-059867.
Decision to grant a patent mailed Apr. 14, 2015, corresponding to Japanese patent application No. 2013-059867.

* cited by examiner

*Primary Examiner* — Sunil K Singh
*Assistant Examiner* — Alan Snyder
(74) *Attorney, Agent, or Firm* — Hauptman Ham, LLP

(57) ABSTRACT

A machine tool includes a table, a saddle, and first and second telescopic covers respectively disposed on two side surfaces of the table or the saddle. The two side surfaces are opposite each other along the direction of travel of the table or the saddle. Upper surfaces of the first and second telescopic covers are inclined in opposite directions perpendicular to the direction of travel of the table or the saddle.

3 Claims, 7 Drawing Sheets

MACHINE TOOL HAVING MOVABLE COVERS

RELATED APPLICATIONS

The present application claims priority of Japanese Application Number 2013-059867, filed Mar. 22, 2013, the disclosure of which is hereby incorporated by reference herein in its entirety.

BACKGROUND OF THE INVENTION

1. Field of the Invention

The present invention relates to a machine tool including movable covers which have cover structures suitable for clearance of chips produced during the use of the machine tool.

2. Description of the Related Art

In some machine tools for machining workpieces, a working area is covered by a cover called a splash guard to prevent chips produced during the machining of a workpiece from flying out of the machine tool. To prevent the chips from adhering to driving portions of a table, which is disposed in the working area and on which the workpiece is mounted, one ends of telescopic covers are fixed to the table, and other ends thereof are fixed to side surface portions of the splash guard. In such a machine tool, chips may accumulate on the telescopic covers fixed to the table. To solve this problem, Japanese Patent Application Laid-Open Nos. 6-91457 and 11-70438 disclose techniques in which upper surfaces of telescopic covers are inclined and thus made resistant to the accumulation of chips.

However, in the above-described technique disclosed in Japanese Patent Application Laid-Open No. 6-91457, no measure is taken to actively scratch away chips, except that the upper surfaces of the telescopic covers are inclined. Accordingly, chips are not sufficiently cleared from the working area.

Moreover, in the above-described technique disclosed in Japanese Patent Application Laid-Open No. 11-70438, measures are taken to clear chips in a machine of a type in which a table having a workpiece mounted thereon is fixed and in which a column having a spindle is movable. However, no technique for improving clearance of chips in a machine of a type in which a table moves in two directions in a horizontal plane has been disclosed.

SUMMARY OF THE INVENTION

In view of the above-described problem of the prior art techniques, an object of the present invention is to provide a machine tool including movable covers which have cover structures suitable for clearance of chips produced during the use of the machine tool.

A machine tool according to the present invention includes a table and a saddle, and first and second movable covers are respectively disposed on two side surfaces of the table or the saddle, the two side surfaces being opposite each other along a direction of travel of the table or the saddle. Further, upper surfaces of the first and second movable covers are inclined in opposite directions perpendicular to the direction of travel of the table or the saddle.

The angle of inclination of the first cover may be different from the angle of inclination of the second cover.

The machine tool may further include a cutting fluid feed passage for feeding cutting fluid to upper surfaces of the first and second movable covers.

According to the present invention, there can be provided a machine tool including movable covers which have cover structures suitable for clearance of chips produced during the use of the machine.

BRIEF DESCRIPTION OF THE DRAWINGS

These and other objects and features of the present invention will become apparent from the following description of embodiments with reference to the accompanying drawings, in which.

DETAILED DESCRIPTION OF THE PREFERRED EMBODIMENTS

Figure 1:
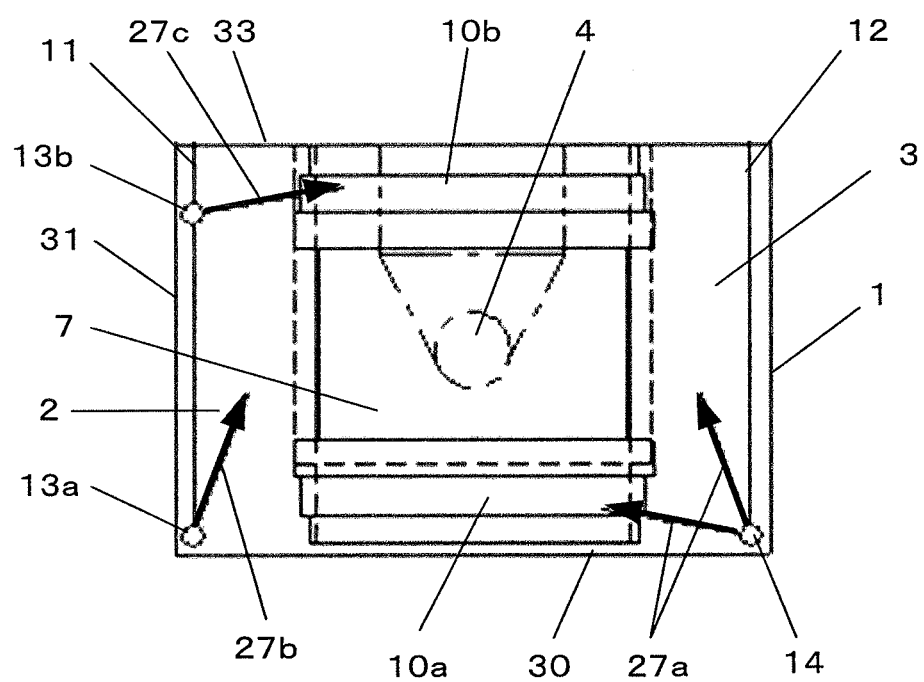
FIG. 1 is a top view (schematic diagram) of a first embodiment of a machine tool according to the present invention.

First, a first embodiment of a machine tool according to the present invention will be described with reference to FIG. 1 (top view) and FIG. 2 (front view).

A cover 1, called a splash guard, of a machine tool 40 isolates a saddle 21, a table 7, a column 18, a spindle 4, and a tool 5 from the outside to define a machining space. The cover 1 includes a front cover 30 facing the column 18 across the table 7, side covers 31 and 32 provided to the left and right of the front cover 30, a rear cover 33, and a ceiling cover (not shown). The front cover 30 and the left and right side covers 31 and 32 have bottom portions connected to the bed 19 from respective lower ends thereof. These bottom portions form a bottom surface of the cover 1.

The saddle 21 is supported on the bed 19 with a saddle moving mechanism 20 (see FIG. 4) interposed therebetween, and the table 7 is supported on the saddle 21 with a table moving mechanism 22 interposed therebetween. A workpiece 6 is mounted on the table 7. Further, the column 18 is installed upright on the bed 19, and the spindle 4 to which the tool 5 is attached is fixed to an upper portion of the column 18. In the machine tool 40, the cutting of the workpiece 6 mounted on the table 7 with the tool 5 is effected by relative motion of the spindle 4 with respect to the table 7 in the machining space. Each of the saddle moving mechanism 20 and the table moving mechanism 22 includes rails and guides which are guided along the rails.

The direction (first direction) of travel of the saddle 21 is perpendicular to the direction (second direction) of travel of the table 7. It should be noted that in this embodiment, the direction of travel of the saddle 21 corresponds to a forward-backward direction (direction perpendicular to the drawing sheet of FIG. 2) of the machine tool 40.

To prevent chips produced during machining from acjhcumulating on driving portions (rails or feed screws) of the saddle, expandable and contractible telescopic covers 10a and 10b are used. Upper surfaces of the telescopic covers 10a and 10b are inclined in directions perpendicular to the direction of expansion and contraction of the telescopic covers 10a and 10b. The telescopic covers 10a and 10b are disposed on opposite sides of the saddle 21 between the saddle 21 and the cover 1 such that the direction of expansion and contraction of the telescopic covers 10a and 10b is the same as the direction of travel of the saddle 21.

Specifically, of the pair of telescopic covers 10a and 10b, one telescopic cover 10a (front-side telescopic cover) has one end fixed to a front end of the saddle 21 and other end fixed to the front cover 30 of the cover 1. The other telescopic cover 10b (rear-side telescopic cover) has one end fixed to a rear end of the saddle 21 and other end fixed to the rear cover 33 of the cover 1. An upper surface of the front-side telescopic cover 10a and an upper surface of the rear-side telescopic cover 10b are inclined in opposite directions, and cutting fluid is fed to each of the upper surface of the front-side telescopic cover 10a and the upper surface of the rear-side telescopic cover 10b. In FIGS. 1 and 2, the upper surface of the front-side telescopic cover 10a disposed in front of the main body of the machine tool slopes down from right to left in the drawings of FIGS. 1 and 2 as shown in FIG. 2, and the upper surface of the rear-side telescopic cover 10b disposed behind the main body of the machine tool slopes down from left to right in the drawings of FIGS. 1 and 2. It should be noted that the upper surface of the front-side telescopic cover 10a and the upper surface of the rear-side telescopic cover 10b may be inclined at different angles.

Figure 2:
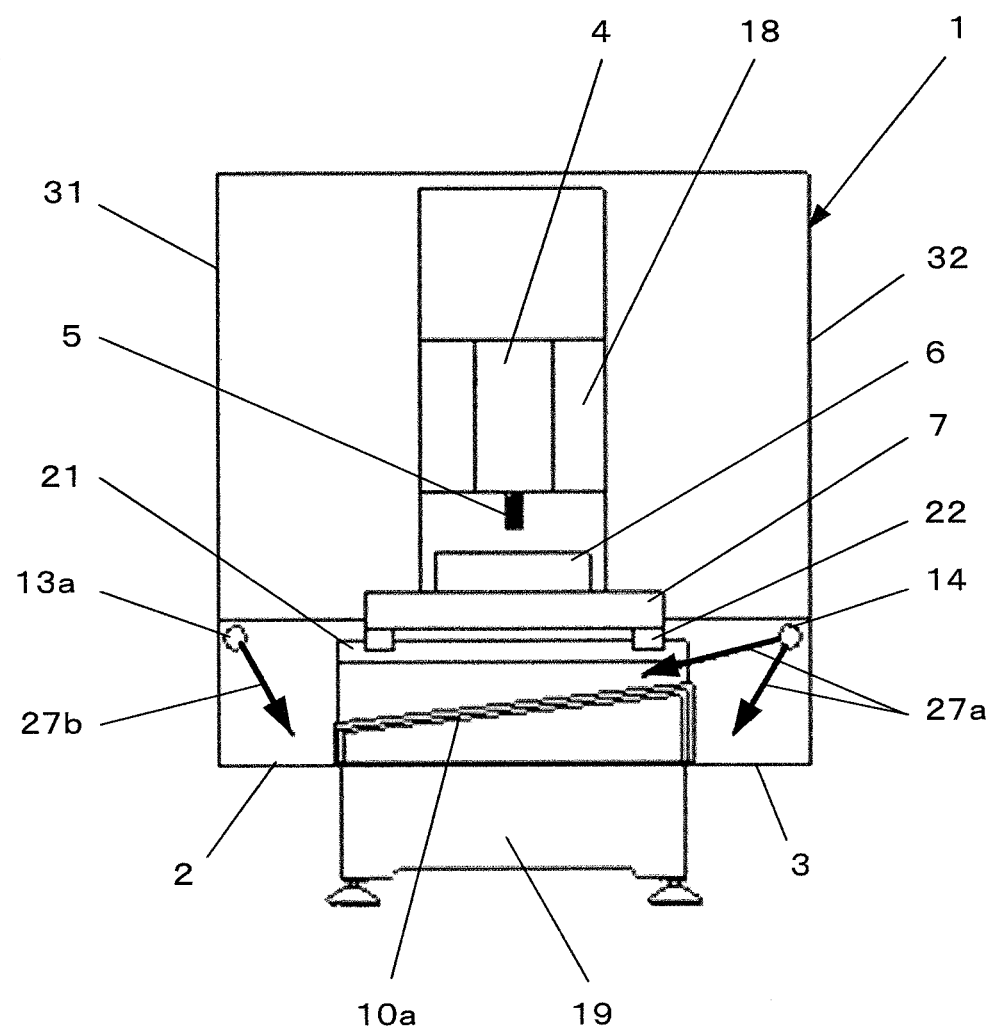
FIG. 2 is a front view (schematic diagram) of the machine tool of FIG. 1.

As shown in FIG. 1, a left-side cutting fluid feed passage 11 and a right-side cutting fluid feed passage 12 are disposed in the machining space so that cutting fluid can be fed to the machining space isolated by the cover 1. Cutting fluid is fed to the left-side cutting fluid feed passage 11 and the right-side cutting fluid feed passage 12 from an unillustrated cutting fluid feed system through unillustrated passages. The left-side cutting fluid feed passage 11 has a first cutting fluid feed nozzle 13a and a second cutting fluid feed nozzle 13b at two predetermined points, and the right-side cutting fluid feed passage 12 has a third cutting fluid feed nozzle 14 at one predetermined point. These first, second, and third cutting fluid feed nozzles 13a, 13b, and 14 emit cutting fluid in predetermined directions (directions indicated by arrows 27b, 27c, and 27a in FIG. 1) within the machining space.

For example, cutting fluid is emitted to the upper surfaces of the telescopic covers 10a and 10b and bottom portions (a left-side bottom surface 2 which is a bottom surface of a bottom portion connected to a left end of the bed 19 from the lower end of the left side cover 31, and a right-side bottom surface 3 which is a bottom surface of a bottom portion connected to a right end of the bed 19 from the lower end of the right side cover 32) of the cover 1. Since the first cutting fluid feed nozzle 13a is disposed beyond the bottom of the slope of the front-side telescopic cover 10a, the first cutting fluid feed nozzle 13a emits cutting fluid toward the left-side bottom surface 2 of the cover 1. On the other hand, the second cutting fluid feed nozzle 13b emits cutting fluid toward an upper portion of the slope of the rear-side telescopic cover 10b, and the cutting fluid causes chips which have fallen onto the upper surface of the rear-side telescopic cover 10b, to flow downward toward the right-side bottom surface 3 of the cover 1. The third cutting fluid feed nozzle 14 emits cutting fluid toward an upper portion of the slope of the front-side telescopic cover 10a and the right-side bottom surface 3 of the cover 1.

Chips which have fallen onto the upper surface of the front-side telescopic cover 10a flow downward with cutting fluid toward the left-side bottom surface 2 of the cover 1 (splash guard), and chips which have fallen onto the upper surface of the rear-side telescopic cover 10b flow downward with cutting fluid toward the right-side bottom surface 3 of the cover 1. Cutting fluid which has been passed through the left-side cutting fluid feed passage 11 and the right-side cutting fluid feed passage 12 disposed within the cover 1 and which has been emitted from the first, second, and third cutting fluid feed nozzles 13a, 13b, and 14 to be fed to the upper surfaces of the telescopic covers 10a and 10b, flows from higher sides of the upper surfaces (slopes) of the telescopic covers 10a and 10b to lower sides thereof.

The above-described configuration can be expected to have the effect of improving the clearance of chips by dispersing chips falling from the telescopic covers 10a and 10b onto bottom portions of the cover 1 (splash guard) and thus preventing the chips from being concentrated in specific regions. Moreover, in regions far from the machining fluid feed system, which have low feeds of cutting fluid, the removal of chips can be facilitated by making the inclinations of telescopic covers in such regions larger than those in other regions.

Next, a second embodiment of a machine tool according to the present invention will be described with reference to FIG. 3 (top view) and FIG. 4 (front view).

A cover 1 called a splash guard isolates a saddle 21, a table 7, a column 18, a spindle 4, and a tool 5 from the outside to define a machining space. The cover 1 includes a front cover 30 facing the column 18 across the table 7, side covers 31 and 32 provided to the left and right of the front cover 30, a rear cover 33, and a ceiling cover (not shown). The front cover 30 and the left and right side covers 31 and 32 have bottom portions connected to the bed 19 from respective lower ends thereof. These bottom portions form a bottom surface of the cover 1.

The saddle 21 is supported on the bed 19 with a saddle moving mechanism 20 interposed therebetween, and the table 7 is supported on the saddle 21 with a table moving mechanism 22 interposed therebetween. A workpiece 6 is mounted on the table 7. Further, the column 18 is installed upright on the bed 19, and the spindle 4 to which the tool 5 is attached is fixed to an upper portion of the column 18. In the machine tool 40, the cutting of the workpiece 6 mounted on the table 7 with the tool 5 is effected by relative motion between the spindle 4 and the table 7 in the machining space. Each of the saddle moving mechanism 20 and the table moving mechanism 22 includes rails and guides which are guided along the rails. The direction (second direction) of travel of the saddle 21 is perpendicular to the direction (first direction) of travel of the table 7. It should be noted that in this embodiment, the direction of travel of the saddle 21 corresponds to a left-right direction (left-right direction of the drawing sheet of FIG. 4) of the machine tool 40.

To prevent chips produced during machining from accumulating on driving portions (rails or feed screws) of the saddle, expandable and contractible telescopic covers 10c and 10d are used. Upper surfaces of the telescopic covers 10c and 10d are inclined in directions perpendicular to the direction of expansion and contraction of the telescopic covers 10c and 10d. The telescopic covers 10c and 10d are disposed on opposite sides of the saddle 21 between the saddle 21 and the cover 1 such that the direction of expansion and contraction of the telescopic covers 10c and 10d is the same as the direction of travel of the saddle 21.

Specifically, of the pair of telescopic covers 10c and 10d, one telescopic cover 10c (left-side telescopic cover) has one end fixed to a left end of the saddle 21 and other end fixed to the left side cover 31 of the cover 1. The other telescopic cover 10d (right-side telescopic cover) has one end fixed to a right end of the saddle 21 and other end fixed to the right side cover 32 of the cover 1. An upper surface of the left-side telescopic cover 10c and an upper surface of the right-side telescopic cover 10d are inclined in opposite directions, and cutting fluid is fed to each of the upper surface of the left-side telescopic cover 10c and the upper surface of the right-side telescopic cover 10d. In FIGS. 3 and 4, the upper surface of the left-side telescopic cover 10c disposed to the left of the main body of the machine tool slopes down from rear to front, and, on the other hand, the upper surface of the right-side telescopic cover 10d disposed to the right of the main body of the machine tool slopes down from front to rear as shown in FIG. 4. It should be noted that the upper surface of the left-side telescopic cover 10c and the upper surface of the right-side telescopic cover 10d may be inclined at different angles.

Figure 3:
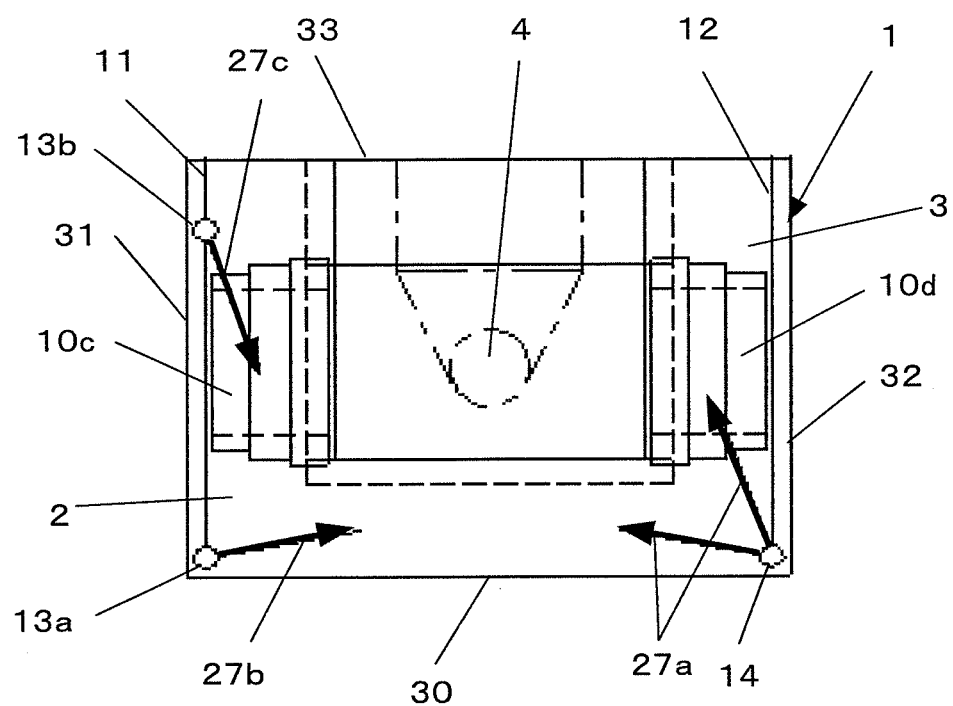
FIG. 3 is a top view (schematic diagram) of a second embodiment of a machine tool according to the present invention.
Figure 4:
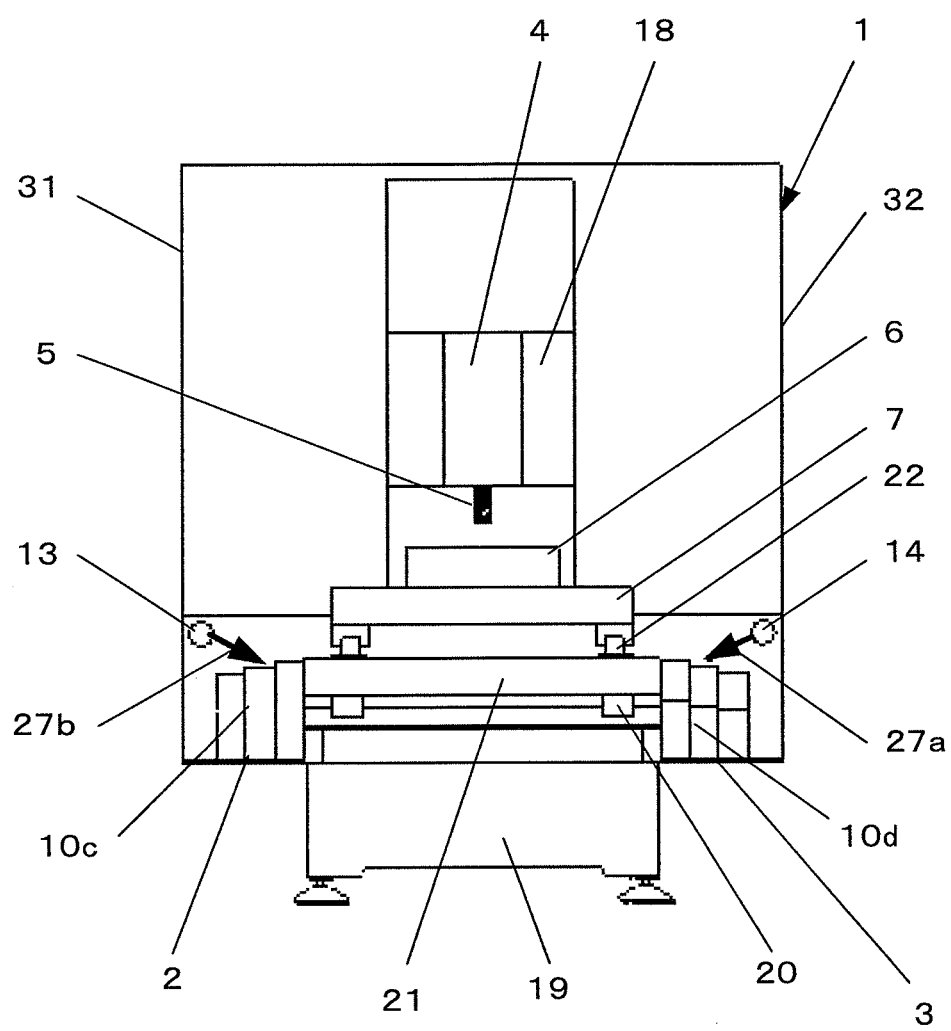
FIG. 4 is a front view (schematic diagram) of the machine tool of FIG. 3.

As shown in FIG. 3, a left-side cutting fluid feed passage 11 and a right-side cutting fluid feed passage 12 are disposed in the machining space so that cutting fluid can be fed to the machining space isolated by the cover 1. Cutting fluid is fed to the left-side cutting fluid feed passage 11 and the right-side cutting fluid feed passage 12 from an unillustrated cutting fluid feed system through unillustrated passages. The left-side cutting fluid feed passage 11 has a first cutting fluid feed nozzle 13a and a second cutting fluid feed nozzle 13b at two predetermined points, and the right-side cutting fluid feed passage 12 has a third cutting fluid feed nozzle 14 at one predetermined point. These first, second, and third cutting fluid feed nozzles 13a, 13b, and 14 emit cutting fluid in predetermined directions (directions indicated by arrows 27b, 27c, and 27a in FIG. 1) within the machining space.

For example, cutting fluid is emitted to the upper surfaces of the telescopic covers 10c and 10d and bottom portions (a left-side bottom surface 2 which is a bottom surface of a bottom portion connected to a left end of the bed 19 from the lower end of the left side cover 31, and a right-side bottom surface 3 which is a bottom surface of a bottom portion connected to a right end of the bed 19 from the lower end of the right side cover 32) of the cover 1. Since the first cutting fluid feed nozzle 13a is disposed beyond the bottom of the slope of the left-side telescopic cover 10c, the first cutting fluid feed nozzle 13a emits cutting fluid toward the left-side bottom surface 2 of the cover 1. On the other hand, the second cutting fluid feed nozzle 13b emits cutting fluid toward an upper portion of the slope of the left-side telescopic cover 10c, and the cutting fluid causes chips which have fallen onto the upper surface of the left-side telescopic cover 10c, to flow downward toward the left-side bottom surface 2 of the cover 1. The third cutting fluid feed nozzle 14 emits cutting fluid toward an upper portion of the slope of the right-side telescopic cover 10d and the right-side bottom surface 3 of the cover 1.

Chips which have fallen onto the upper surface of the left-side telescopic cover 10c flows downward with cutting fluid toward the left-side bottom surface 2 of the cover 1 (splash guard), and chips which have fallen onto the upper surface of the right-side telescopic cover 10d flows downward with cutting fluid toward the right-side bottom surface 3 of the cover 1. Cutting fluid which has been passed through the left-side cutting fluid feed passage 11 and the right-side cutting fluid feed passage 12 disposed within the cover 1 and which has been emitted from the first, second, and third cutting fluid feed nozzles 13a, 13b, and 14 to be fed to the upper surfaces of the telescopic covers 10c and 10d, flows from higher sides of the upper surfaces (slopes) of the telescopic covers 10c and 10d to lower sides thereof.

The above-described configuration can be expected to have the effect of improving the clearance of chips by dispersing chips falling from the telescopic covers 10c and 10d onto bottom surfaces of the cover 1 (splash guard) and preventing the chips from being concentrated in specific regions. Moreover, in regions far from the machining fluid feed system, which have low feeds of cutting fluid, the removal of chips can be facilitated by making the inclinations of telescopic covers in such regions larger than those in other regions.

In the above-described embodiments of the present invention, one ends of the telescopic covers 10a and 10b are fixed to the saddle 21. Instead of this, one ends of the telescopic covers 10a and 10b may be fixed to the table 7 so that chips may not fall onto the table moving mechanism 22.

Figure 5A:
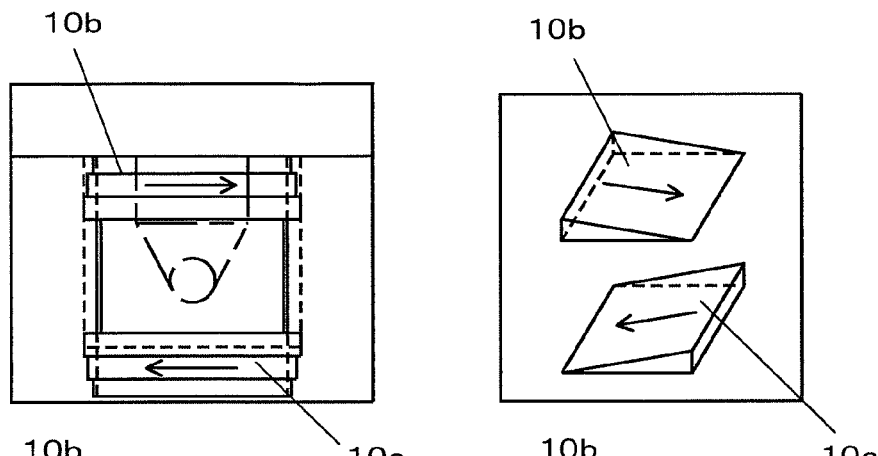
FIGS. 5A and 5B illustrate an aspect in which an upper surface of one of a pair of telescopic covers shown in FIG. 1 and an upper surface of the other are inclined in different directions.
Figure 5B:
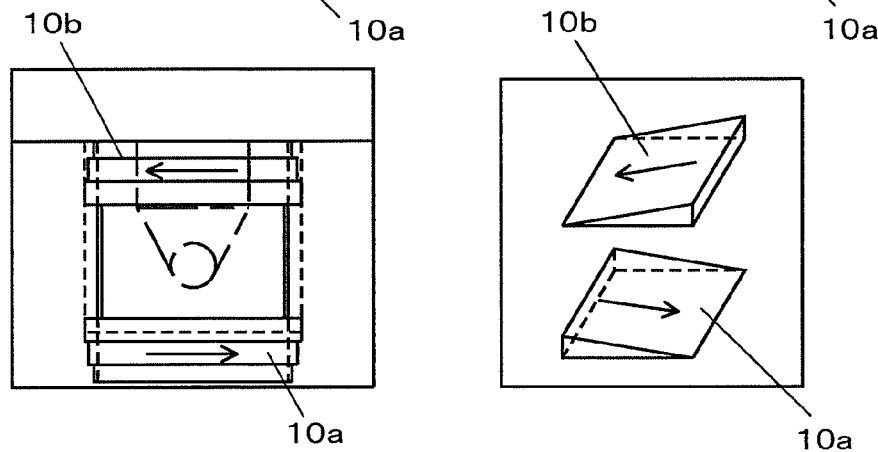

FIGS. 5A and 5B show a machine tool in which the front-side telescopic cover 10a (first movable cover) and the rear-side telescopic cover 10b (second movable cover) are respectively disposed on two side surfaces (front side surface and rear side surface) of any one of the table and the saddle of the machine tool, the two side surfaces being opposite each other along the direction of travel of the any one of the table and the saddle, and show the directions of inclination (see arrows) of the upper surface of the front-side telescopic cover 10a and the upper surface of the rear-side telescopic cover 10b. It should be noted that in FIGS. 5A and 5B, the upper surface of the front-side telescopic cover 10a and the upper surface of the rear-side telescopic cover 10b are inclined at the same angle.

Figure 6A:
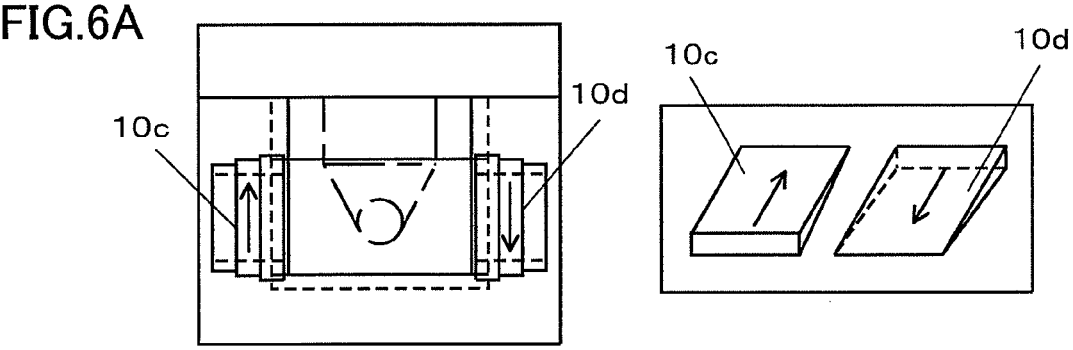
FIGS. 6A and 6B illustrate an aspect in which an upper surface of one of a pair of telescopic covers shown in FIG. 3 and an upper surface of the other are inclined in different directions.
Figure 6B:
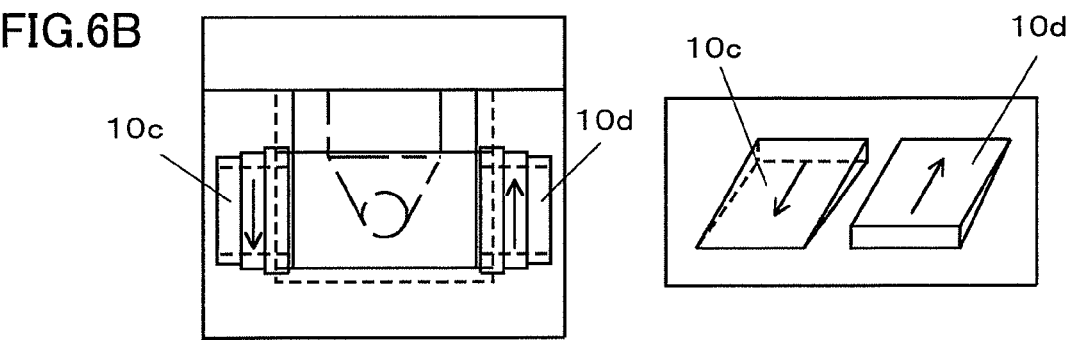

FIGS. 6A and 6B show a machine tool in which the left-side telescopic cover 10c (first movable cover) and the right-side telescopic cover 10d (second movable cover) are respectively disposed on two side surfaces (left side surface and right side surface) of the table or the saddle of the machine tool, the two side surfaces being opposite each other along the direction of travel of the table or the saddle, and show the directions of inclination (see arrows) of the upper surface of the left-side telescopic cover 10c and the upper surface of the right-side telescopic cover 10d. It should be noted that in FIGS. 6A and 6B, the upper surface of the left-side telescopic cover 10c and the upper surface of the right-side telescopic cover 10d are inclined at the same angle.

Figure 7A:
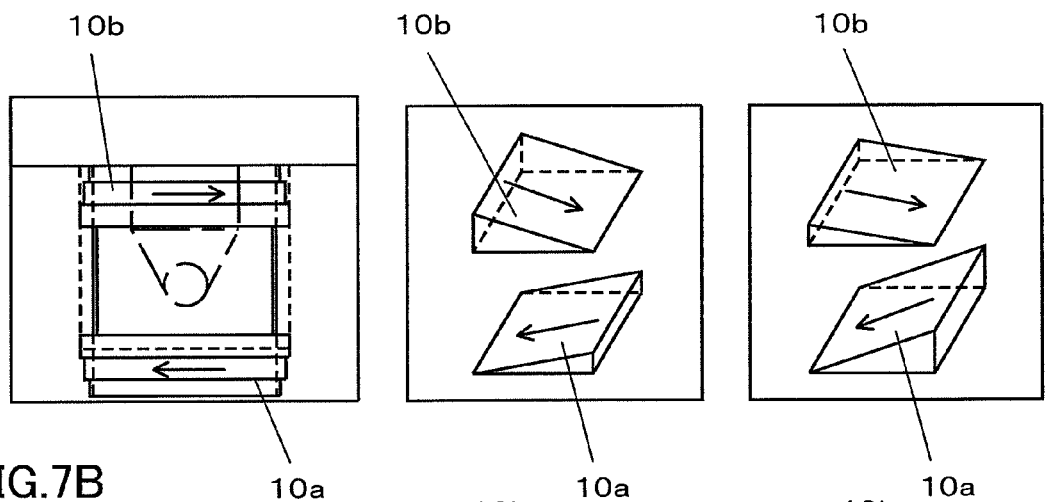
FIGS. 7A and 7B illustrate an aspect in which an upper surface of one of the pair of telescopic covers shown in FIG. 1 and an upper surface of the other are inclined in different directions at different angles.
Figure 7B:
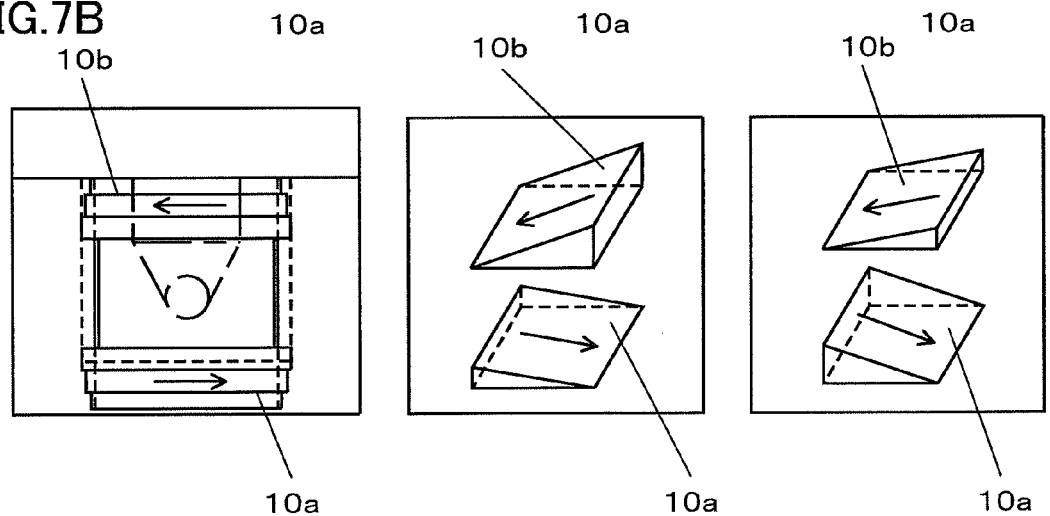

FIGS. 7A and 7B show a machine tool in which the front-side telescopic cover 10a (first movable cover) and the rear-side telescopic cover 10b (second movable cover) are respectively disposed on two side surfaces (front side surface and rear side surface) of the table or the saddle of the machine tool, the two side surfaces being opposite each other along the direction of travel of the table or the saddle, and show the directions of inclination (see arrows) of the upper surface of the front-side telescopic cover 10a and the upper surface of the rear-side telescopic cover 10b. In FIGS. 7A and 7B, the upper surface of the front-side telescopic cover 10a and the upper surface of the rear-side telescopic cover 10b are inclined at different angles (the right part of each of FIGS. 7A and 7B shows two examples, in each of which the upper surface of the front-side telescopic cover 10a and the upper surface of the rear-side telescopic cover 10b are inclined at different angles).

Figure 8A:
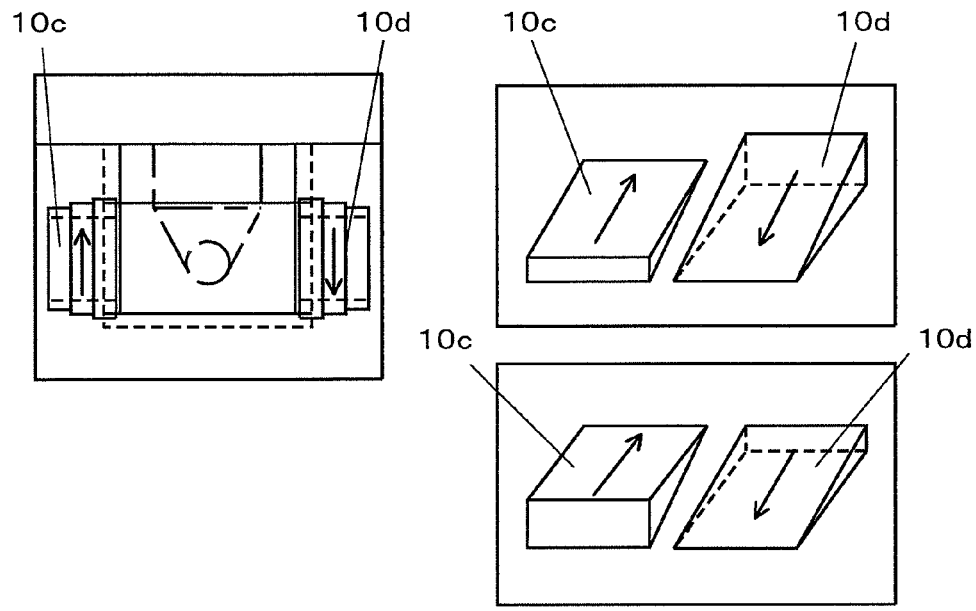
FIGS. 8A and 8B illustrate an aspect in which an upper surface of one of the pair of telescopic covers shown in FIG. 3 and an upper surface of the other are inclined in different directions at different angles.
Figure 8B:
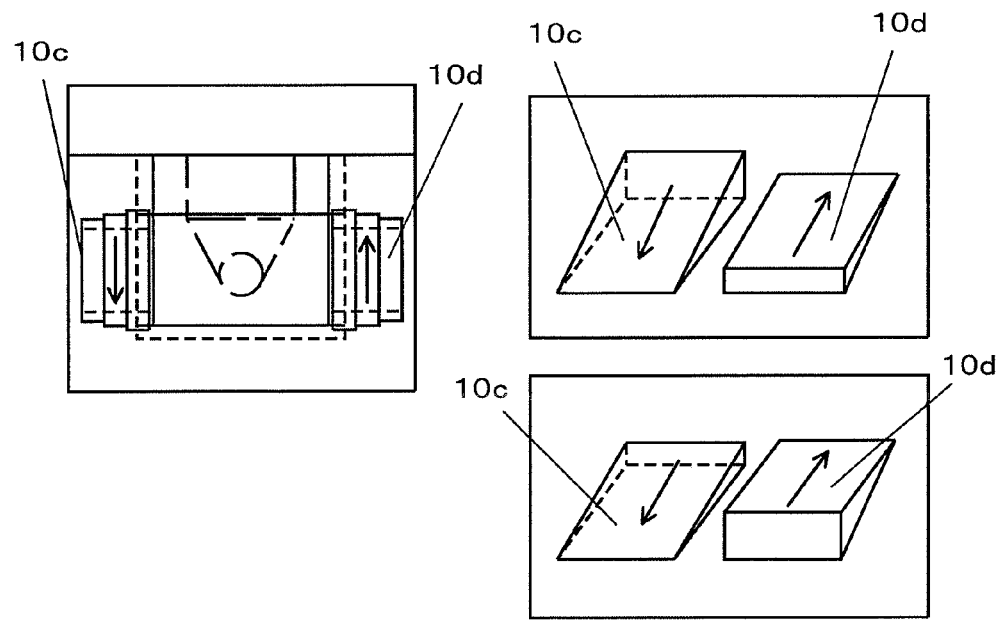

FIGS. 8A and 8B show a machine tool in which the left-side telescopic cover 10c and the right-side telescopic cover 10d are respectively disposed on two side surfaces (left side surface and right side surface) of the table or the saddle of the machine tool, the two side surfaces being opposite each other along the direction of travel of the table or the saddle, and show the directions of inclination (see arrows) of the upper surface of the left-side telescopic cover 10c and the upper surface of the right-side telescopic cover 10d. It should be noted that in FIGS. 8A and 8B, the upper surface of the left-side telescopic cover 10c and the upper surface of the right-side telescopic cover 10d are inclined at different angles (the right part of each of FIGS. 8A and 8B shows two examples, in each of which the upper surface of the left-side telescopic cover 10c and the upper surface of the right-side telescopic cover 10d are inclined at different angles).

The invention claimed is:

1. A machine tool, comprising:
a cover covering a machining space;
a table;
a saddle; and
a pair of expandable and contractible movable covers respectively disposed on two side surfaces of the table or the saddle in the moving direction thereof, wherein
one end of each of the expandable and contractible movable covers is fixed to a side surface of the table or the saddle and the other end of each of the expandable and contractible movable covers is fixed to the cover;
upper surfaces of the movable covers are inclined in a direction perpendicular to the direction of expansion and contraction of the movable covers in a manner such that they slope down from one side not fixed to any one of the table, cover or saddle to the other side, and
a direction of inclination of the upper surface of one of the movable covers is opposite to that of the other of the movable covers so that chips which have fallen onto the upper surfaces of the movable covers flow downward from the other sides of the movable covers toward opposite sides of the table or saddle in opposite directions.

2. The machine tool according to claim 1, wherein an angle of inclination of one of the movable covers is different from an angle of inclination of the other of the movable covers.

3. The machine tool according to claim 1, further comprising a cutting fluid feed passage for feeding cutting fluid to the upper surfaces of the movable covers.

* * * * *